United States Patent

Schroeder

[11] Patent Number: 5,805,060
[45] Date of Patent: Sep. 8, 1998

[54] ELECTRONIC DEVICE TO INDICATE THE ACCELERATION AND DECELERATION FOR VEHICLES

[76] Inventor: Alberto Nicanor Schroeder, San Martín 686, 7th. fl. of. 72, Buenos Aires, Argentina

[21] Appl. No.: 717,459

[22] Filed: Sep. 20, 1996

[30] Foreign Application Priority Data

Oct. 20, 1995 [AR] Argentina .................................. 333.908

[51] Int. Cl.$^6$ ...................................................... B60Q 1/50
[52] U.S. Cl. .......................... 340/467; 340/463; 340/466; 364/426.041
[58] Field of Search ...................................... 340/463, 464, 340/466, 467, 468, 441, 479; 123/415, 418, 352; 318/375, 376, 380; 364/426.041; 180/179

[56] References Cited

U.S. PATENT DOCUMENTS

| | | | |
|---|---|---|---|
| 3,597,669 | 8/1971 | Soltz | 318/17 |
| 3,784,974 | 1/1974 | Hamashige | 340/464 |
| 4,086,812 | 5/1978 | Lüthe et al. | 340/332 |
| 4,171,030 | 10/1979 | Ruhl | 180/179 |
| 4,213,125 | 7/1980 | Watanabe | 345/39 |
| 4,258,353 | 3/1981 | Carlson | 340/467 |
| 4,320,384 | 3/1982 | Carlson | 340/467 |
| 4,380,799 | 4/1983 | Allard et al. | 364/426.041 |
| 5,043,698 | 8/1991 | Tabacchi | 340/467 |
| 5,373,426 | 12/1994 | O'Sullivan | 362/83.3 |

Primary Examiner—Jeffrey Hofsass
Assistant Examiner—Davetta Woods
Attorney, Agent, or Firm—Staas & Halsey

[57] ABSTRACT

Electronic device to indicate the acceleration and deceleration for vehicles; being able to be driven through means connecting to the accelerator and able to generate luminous signals which can be seen by other vehicles; characterized because, being supplied by means of a source provided with a power regulator, said device comprehends a potentiometer, that, constituting a transductor of the mechanical movement of the accelerator, is connected to a comparator circuit; said comparator circuit constituted by a plurality of operational amplifiers, each one of said operational amplifiers having a first input connected to the potentiometer, while a second input is connected to a respective terminal of a voltage divider; the output of each operational amplifier is connected to the input of a respective power amplifier which at the same time has a plurality of luminous elements connected to its output, said luminous elements constituting at least one luminous display; said display including complementary luminous elements which can be enabled in a selective way by the potentiometer in at least one of its limit positions, by means of a selective driving circuit.

10 Claims, 3 Drawing Sheets

ELECTRONIC DEVICE TO INDICATE THE ACCELERATION AND DECELERATION FOR VEHICLES

BACKGROUND OF THE INVENTION

The present invention concerns an electronic device to indicate the acceleration and deceleration for vehicles.

It refers to an electronic device destined to indicate the acceleration and deceleration of a vehicle by means of luminous signal indicators that appear in a display that can be seen by the drivers of the vehicles which are near to the one with such device.

Most of car crashes that occur, especially in routes and expressways, are due to the lack of adequate security elements in the vehicles which would allow the drivers to foresee the maneuvers that vehicles which are behind and in front are about to effect. Thus, unforeseen maneuvers are the main cause of car crashes, especially in ways where the traffic is fast.

In order to increase security and avoid these accidents, luminous elements such as brakelights, turn lights, side-marker lights, intermittent warning lights or luminous devices are displayed at the back part of the vehicle too. In some cases, these conform sets of showy lights which can be intermittent and in other cases they can also have warning words such as "stop", etc.

Normally, they are devices such as direct-driving microswitches or very elementary circuits, being their function to produce an intermittent light motion or to effect a set of lights in order only to call the attention of others.

But, in general, there are no devices which can specifically indicate to the driver of another vehicle—which may be behind or in front of the reference vehicle—if the reference vehicle is accelerating or decelerating in an efficient, accurate and clear way. This is particularly important in the case of abrupt deceleration before stopping, as an instant may be determining to avoid the crash. It is also equally important when a vehicle accelerates before surpassing another vehicle.

There are other known devices which have tried to solve the problem, but their drawback is that the indicating lights are connected in a direct way to the driving means located in the accelerator. This type of device lacks a circuit generator of internal reference signals, which gives place to misreading and failures, which turns it into an untrustworthy device.

Instead, the device of the present invention solves these problems by means of a comparator circuit that compares the variations in the position of the accelerator sensed by the lineal potentiometer, with reference signals provided by a voltage divider.

On the other hand, in the known devices the driving means acts directly on the circuit with the load.

In the case of the present invention the comparator circuit is preserved by means of a stage amplifier of power, the luminous elements comprising a display being connected at its outlet.

Furthermore, the luminous elements are disposed in groups connected by branchings, thus defining luminous levels that indicate acceleration as they connect, and deceleration as they disconnect in the display. This new device also includes a selective driving circuit that actions one part of the luminous elements when there is no acceleration or deceleration.

BRIEF DESCRIPTION OF THE DRAWINGS

In order to clarify and a better comprehension of the object of the invention, the same is illustrated with several figures in which it has been represented in one of its preferred embodiments, all of this as a non limiting example.

In the different figures, the same reference numbers indicate equal or corresponding parts, and the sets of several elements have been marked with letters.

Figure 1:
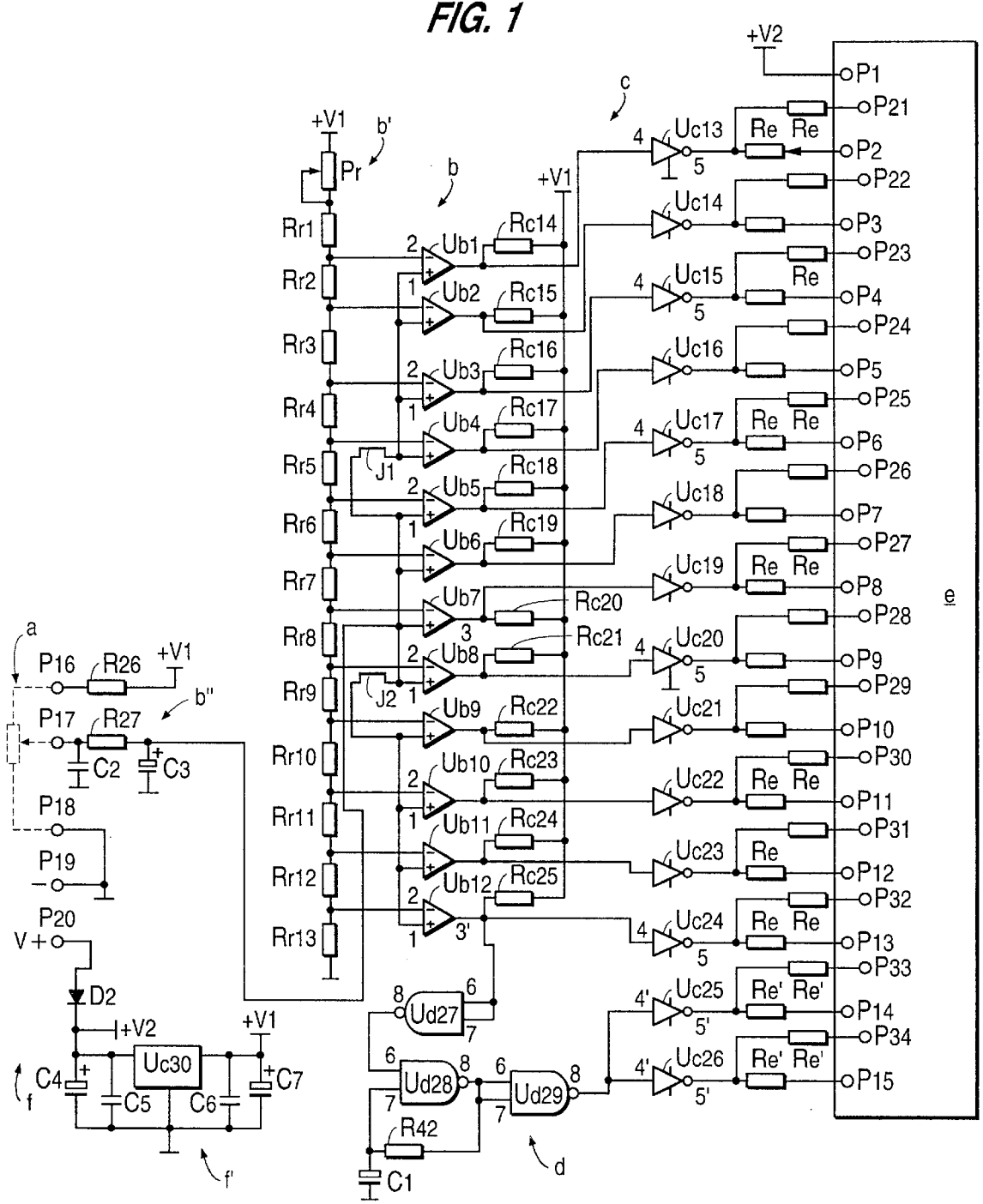
FIG. 1 is a schematic diagram of the circuitry of the indicating electronic device where both the circuit that comprise it and the connecting terminal with the display can be seen.
Figure 2:
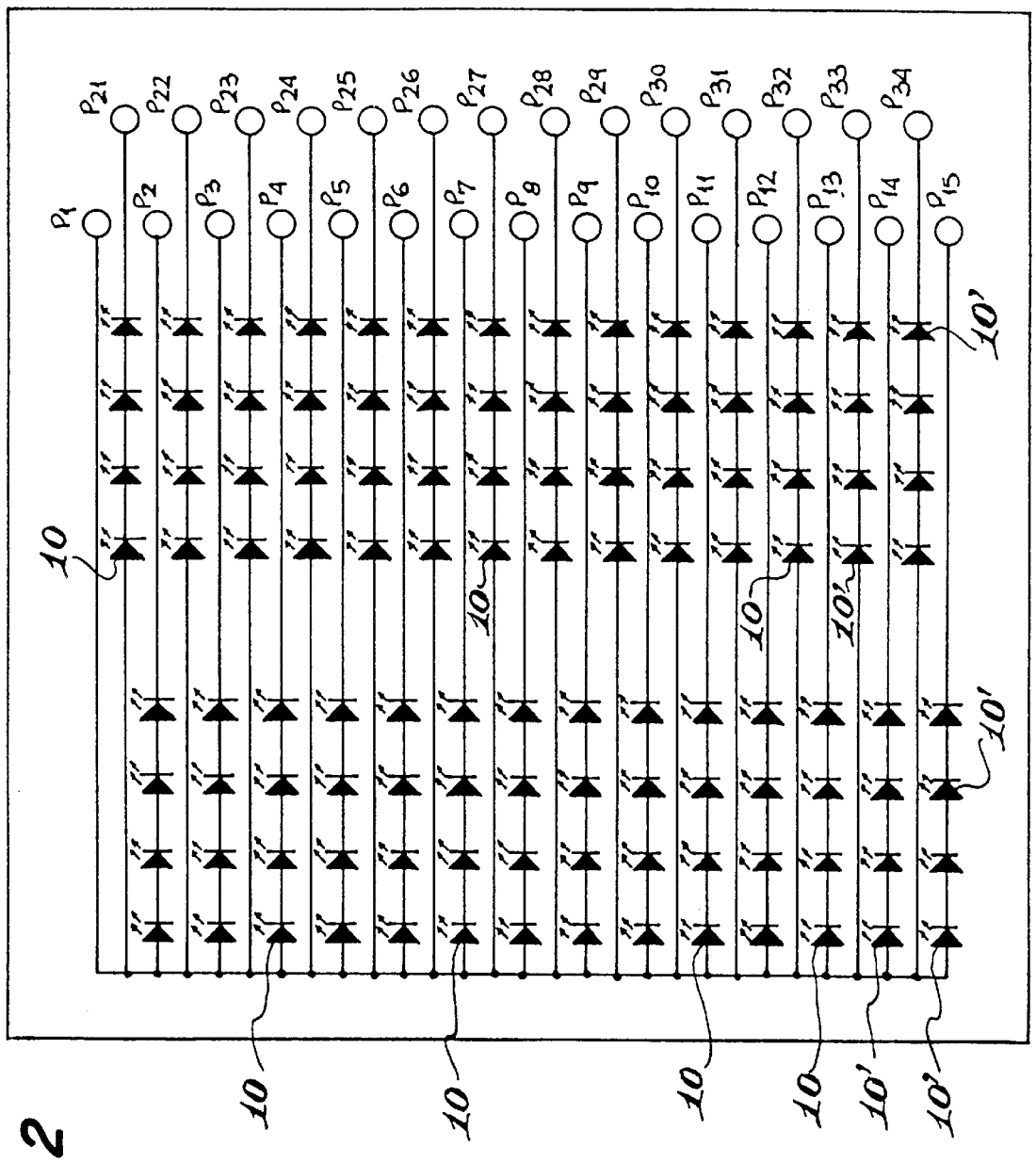
FIG. 2 is a schematic diagram of the display in which the luminous elements that constitute the same can be seen. Part of these, being connected at the inferior branchings, are controlled by the selective driving oscillatory circuit.
Figure 3:
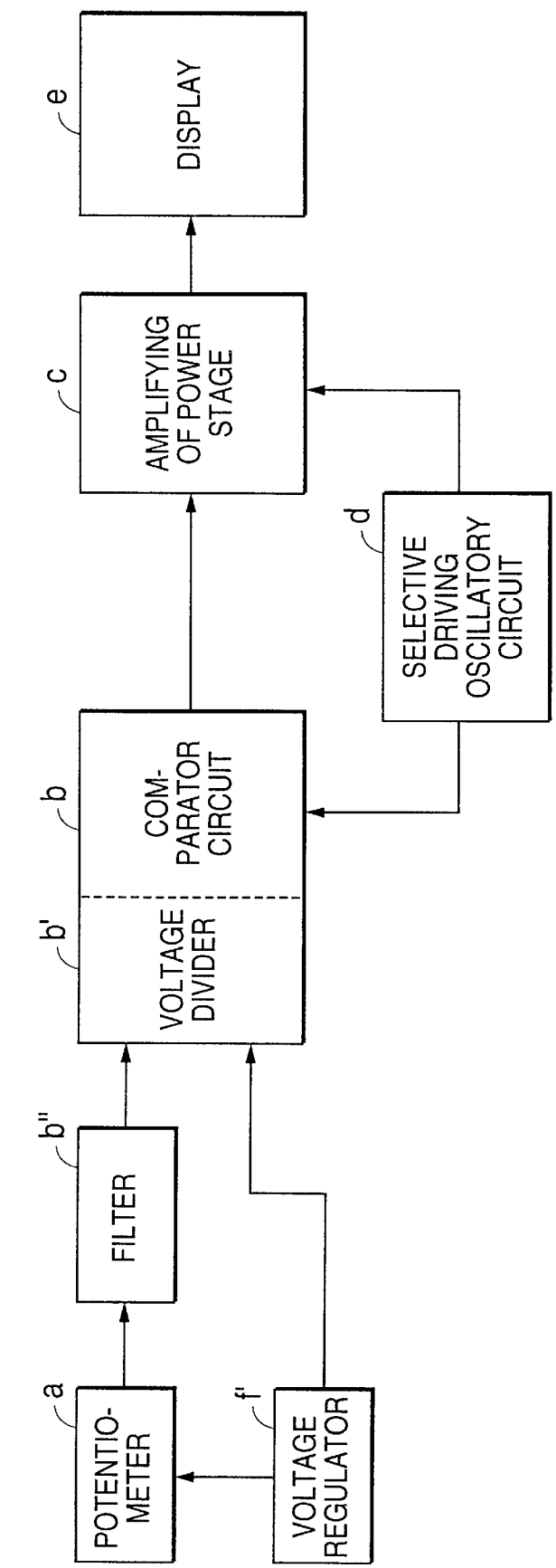
FIG. 3 is a block diagram of the device.

List of main references (a) potentiometer
(b) comparator circuit
(b') voltage divider
(b") filter
(c) amplifying of power stage
(d) selective driving oscillatory circuit
(e) display
(f) power supply
(f') voltage regulator
(V) 12 V. input voltage
(V1) 12 V. output voltage
(V2) 10 V. output voltage
(Ub) operational amplifier constituting (b)
(Uc) power amplifiers
(Uc25) and
(Uc26) power amplifiers connected to the output of (d)
(Ud) gates constituting (d)
(Uf) c.i. constituting (f)
(Rr) reference resistances of comparator (b)
(Rc) polarization resistances to the respective power amplifiers (Up13) to (Up24)
(Re) resistances connected to the luminous elements (10)
(Re') resistances connected to the luminous elements (10')
(R42)(C1) resistance and capacitor for the oscillatory time of (d)
(C2), (C3) and
(R27) capacitors and resistances constituting filter (b')
(C4) to (C7) capacitors of the regulator (f')
(D2) protection diode
(PR) variable adjustable resistance
(J1)(J2) fuses
(P1) terminal of V2 power application
(P2) to (P13) and
(P21) to (P32) connection terminals with the luminous elements (10) of display (e)
(P14), (P15) connection terminals with the luminous elements
(P33) and (P34) (10') of the display (e)
(P16), (P17)
and (P18) connection terminal with potentiometer (a)
(P19)(P20) terminals for the application of V power supply
(1) first input of the operational amplifiers [not inverted]
(2) second input of the operational amplifiers [inverted]
(3) output of the first operational amplifiers (Ub)
(3') output of the first operational amplifier (Ub12)
(4) input of the power amplifiers (Uc25) and (Uc26)
(5) output of the power amplifiers (Uc)
(4') input of the power amplifiers (Uc25) and (Uc26)
(5') output of the power amplifiers (Uc25) to (Uc26)
(6) first input of gates (Ud)

(7) second input of gates (Ud27), (Ud28) and (Ud29)
(8) output of gates (Ud27), (Ud28) and (Ud29)
(10) luminous elements
(10') complementary luminous elements

SUMMARY OF THE INVENTION

Electronic device indicator of the acceleration and deceleration for vehicles, being able to be driven through means connecting to the accelerator and able to generate luminous signals which can be seen by other vehicles; wherein, being supplied by means of a source (f) provided of a power regulator (f'), said device comprehends a potentiometer (a), that, constituting a transductor of the mechanical movement of the accelerator, is connected to a comparator circuit (b); said comparator circuit (b) constituted by a plurality of operational amplifiers (Ub), each one of said operational amplifiers having a first input (1) connected to the potentiometer (a), while a second input (2) is connected to a respective terminal of a voltage divider (b'); the output (3) of each operational amplifier (Ub) is connected to the input (4) of a respective power amplifier (Uc) which at the same time has a plurality of luminous elements (10) connected to its output (5), said luminous elements (10) constituting at least one luminous display (e); said display (e) including complementary luminous elements (10') which can be enabled in a selective way by the potentiometer (a) in at least one of its limit positions, by means of a selective driving circuit (d).

DESCRIPTION OF THE PREFERRED EMBODIMENT

The present invention consists in an electronic device indicator of the acceleration and deceleration for vehicles.

In general terms, the present invention is about an electronic device that can be driven through means connected to the accelerator and able to generate luminous signals which can be seen by other vehicles. This device comprehends a lineal potentiometer (a), which, constituting a transductor of the mechanical movement of the accelerator, is connected to a comparator circuit (b). This comparator circuit (b) is connected to an amplifier of power stage (c) having at its output, a luminous display (e) connected to said amplifier (c). The device includes a selective driving circuit (d), which, enabled by one of the limit positions of the potentiometer (a), controls a part of the display (e).

More particularly, the power supply (f), which can be enabled by means of the switch that starts the vehicle, is provided of a voltage regulator circuit (f') comprising a voltage stabilizer c.i. (Uf such as UA7810KC. Connected to said stabilizer (Uf), there are two capacitors (C4) and (C5) for the filtering of sudden fluctuations in voltage and two other capacitors (C6) and (C7) that complement the c.i. (Up, avoiding some effects generated by the former, such as high frequency oscillations in one case and low frequency oscillations in the other case. The circuit (f') is completed with a diode protector (D2) in case an accidental inversion in the polarity of the source (f) occurs.

On the other hand, the potentiometer (a) and the connection means between one and the other consists in a transductor between the mechanical movements of said accelerator and the electronic device. In this way, the accelerator and its connection means constitute a driving means of the mentioned potentiometer (a).

This potentiometer (a), that is lineal, is connected to the comparator circuit (b) through a filter (b") of electric noises, consisting in two capacitors (C2) and (C3) and a resistance (R27).

The comparator circuit (b) is constituted by a voltage divider (b') and by twelve operational amplifiers (Ub) in a comparating function. These operational amplifiers (Ub) are physically integrated in fours in integrated circuits such as LM339. Each one of these a.o. (Ub) has its not inverted input (1) connected to the output (P17) of the potentiometer (a), while the inverted input (2) is connected to a respective terminal of the voltage divider (b'). Respecting the latter (b'), the same consists in a net of reference resistances (Rr) with intermediate terminals, each one of which is connected with the inverted input (2) of the corresponding operational amplifier(Ub).

The outputs (3) of the comparator (b) are connected with the inputs (4) of an amplifier of power stage (c), its outputs (5) being connected to the respective terminals of a display (e). The power amplifiers (Uc) composing the amplifying stage (c) are present under the form of two c.i. such as ULN2004, each one of which contains seven independent blocks of transistors in a Darlington assembling.

Furthermore, among the output (3) of the comparator (b) and the inputs (4) of the power amplifiers (Uc) there are polarization resistances (Rc) of said amplifiers (Uc) connected to them.

On the other hand, the output (5) of each power amplifier (Uc) bifurcates in two branches, each one of them with resistances (Re) connected to the respective terminals (P2–P13) (P21–P32) of a luminous display (e). Inside the display (e), each one of the branches has four luminous elements serially connected to them, that, in the present embodiment, are constituted by luminous diode emitters. Each pair of branches end in a connection to the terminal (P1) of power application (V1).

Together with this, a complementary part of the luminous elements (10') are connected to the output (5') of two of the power amplifiers (Uc25) and (Uc26), their inlets (4') being connected to a selective driving circuit (d). This circuit (d) is connected to the outlet (3') of the first operational amplifier (Ub12) of the comparator (b) and is composed by three gates (Ud27), (Ud28), and (Ud29). The first of them (Ud27) configured as an inverter, the second (Ud28) as a low frequency oscillator and the third, (Ud29) as an inverter. The circuit (d) also includes a resistance (R42) and a capacitor (C1) connected to the oscillator (Ud28).

The device works in the following way:

The different positions of the accelerator determine, through the interconnection elements with which it composes the transductor, the driving of the lineal potentiometer (a).

In this way, each position of the accelerator corresponds to a determined position of the slide of the potentiometer (a), which at the same time determines a corresponding voltage value at the outlet of the latter (a).

Thus, the signal passes to the comparator circuit (b), with the filter (b") being at its inlet, where the electric noises are filtered, which could be generated by the ignition system of the vehicle or by eventual jumps in the slide of the potentiometer (a).

This signal, already filtered, reaches the inlet of the comparators operational amplifiers (Ub). Each one of these (Ub) have two inlets: one of them not inverter (1) and the other inverter (2), and also an outlet (3) with logic states, connected or disconnected, according to the difference between the loads applied to their inlets (1) and (2). In the not inverted inlet (1) the load determined by the potentiometer (a) is applied, while in the inverter inlet (2) the load determined by the corresponding reference resistance (Rr) of the load divider (b') is applied. Each time that the load determined by the potentiometer (a) is equal or greater than the reference load determined by the divider (b'), the amplifier comparator (Ub) changes its logic state.

As the value of the output load of the potentiometer (a) increases, said value equals and in a successive way becomes greater than the graded values determined by the load divider (b') and, as it has been described, are applied to each inverter inlet (2) of the a.o. (Ub). In this way, said a.o. (Ub) change states in a successive manner.

Thus, the power amplifiers (Uc) are enabled, which, functioning with a low current at the inlet (4) and high current at the output (5), prevent an overload in the operational amplifiers (Ub) of the comparator circuit (b).

In the present way of embodiment, each output of the power amplifier (Uc) bifurcates in two branches, each one of them with four luminous diode emitters (10), which constitutes an acceptable load for the voltage available in the vehicle. This quantity of luminous elements (10) for each output (5) of the amplifier (Uc) ensures a very fine visibility of each signaling level in the display (e).

On the other hand, when the first a.o. (Ub) is in a low state, that is, when the potentiometer (a) does not detect movements of the accelerator, the selective driving circuit (d) activates because the first gate (Ud27) is inverter and enables the second gate (Ud28) with a high state in the first inlet (6). This gate (Ud28), that oscillates on a low frequency determined by the resistance (R42) and the capacitor (C1), allows the intermittent enabling of the complementary luminous elements (10') connected to its output (P14 P33)(P15 P34). When the first inlet (6) of the second gate (Ud28) is in a low state, its output (8) prevents the enabling of the corresponding power amplifiers (Uc25) and (Uc26) and, therefore, the lighting of those complementary luminous elements (10').

In this way, the selective driving oscillatory circuit (d) allows the intermittent lighting of the complementary diodes (10') connected to it, when no acceleration or deceleration is detected, or, on the contrary the turning off of the same.

It cannot be doubted that when the present invention is put into practice, modifications may be introduced concerning certain details in construction and shape, without implying drawing apart from the fundamental principles that are clearly substantiated in the clauses of the following claims:

Claims:

Having thus described and determined the nature of the present invention, and how it may be carried out, it is claimed, as of exclusive right and ownership:

1. An electronic device to indicate the acceleration and deceleration of a vehicle, the device being connected to an accelerator of the vehicle, comprising:

a potentiometer connected to the accelerator, the potentiometer having an output with the magnitude of the output being determined by a position of the accelerator;

a comparator circuit having a plurality of operational amplifiers, each of the operational amplifiers having a first input connected to the potentiometer, each of he operational amplifiers also having a second input and an output;

a voltage divider having a plurality of points with successively decreasing voltages, the plurality of points being connected respectively to the second inputs of the operational amplifiers;

a plurality of power amplifiers having inputs connected respectively to the outputs of the operational amplifiers, the power amplifiers also having outputs; and a plurality of luminous elements connected respectively to the outputs of the power amplifiers such that the luminous elements are successively activated and deactivated with changing position of the accelerator, the luminous elements being positioned on the vehicle to be visible by drivers of other vehicles.

2. An electronic device to indicate the acceleration and deceleration of a vehicle according to claim 1, wherein the voltage divider includes a net of reference resistors with intermediate terminals, the intermediate terminals being connected respectively to the second inputs of the operational amplifiers.

3. An electronic device to indicate the acceleration and deceleration of a vehicle according to claim 1, wherein the potentiometer is a lineal potentiometer.

4. An electronic device to indicate the acceleration and deceleration of a vehicle according to claim 1, wherein the potentiometer has a limit position, the device further comprising a selected driving circuit connected to a luminous element for activating the luminous element when the potentiometer is at the limit position.

5. An electronic device to indicate the acceleration and deceleration of a vehicle according to claim 4, wherein the selective driving circuit is an oscillating circuit.

6. An electronic device to indicate the acceleration and deceleration of a vehicle according to claim 4, wherein the selective driving circuit is a low frequency oscillating circuit.

7. An electronic device to indicate the acceleration and deceleration of a vehicle according to claim 1, wherein the luminous elements are diodes that emit light.

8. An electronic device to indicate the acceleration and deceleration of a vehicle according to claim 1, wherein the first input of each operational amplifier is not inverted, while the second input is inverted.

9. An electronic device to indicate the acceleration and deceleration of a vehicle, according to claim 4, wherein the luminous elements are light emitting diodes and a plurality of light emitting diodes are connected to each of the outputs of the power amplifier.

10. An electronic device to indicate the acceleration and deceleration of a vehicle according to claim 1, further comprising a source with a power regulator, connected to the voltage divider, the plurality of power amplifiers and the plurality of luminous elements.

* * * * *